United States Patent [19]
Jones

[11] 4,057,081
[45] Nov. 8, 1977

[54] PIPELINE PIGS

[75] Inventor: Trevor Clifford Jones, Stroud, England

[73] Assignee: Underground Location Services Limited, Stonehouse, England

[21] Appl. No.: 674,737

[22] Filed: Apr. 6, 1976

[30] Foreign Application Priority Data

Apr. 9, 1975 United Kingdom ............... 14562/75

[51] Int. Cl.$^2$ ....................... F16L 55/12; G01R 19/00
[52] U.S. Cl. ..................................................... 138/97
[58] Field of Search ....................... 138/97, 93, 89, 98, 138/155

[56] References Cited

U.S. PATENT DOCUMENTS

| 2,894,539 | 7/1959 | Cook et al. | 138/97 |
| 3,285,290 | 11/1959 | Morrison | 138/97 |
| 3,495,626 | 2/1970 | Nagel | 138/97 |
| 3,503,424 | 3/1970 | Sawyer | 138/97 |
| 3,796,233 | 3/1974 | Lacey | 138/97 |

Primary Examiner—Henry K. Artis
Attorney, Agent, or Firm—Young & Thompson

[57] ABSTRACT

A magnetically detectable attachment for a pipeline pig comprises a wheel formed from two discs of magnetic material which serve as pole pieces for a permanent magnet mounted therebetween. The wheel is arranged, in use, to run along the top of the inside of the pipeline so as to magnetize a narrow longitudinal strip of the pipeline wall as the pig passes therealong.

9 Claims, 6 Drawing Figures

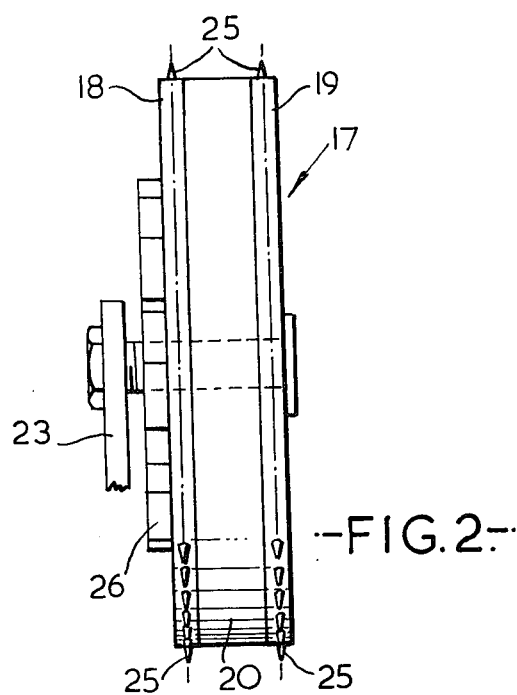
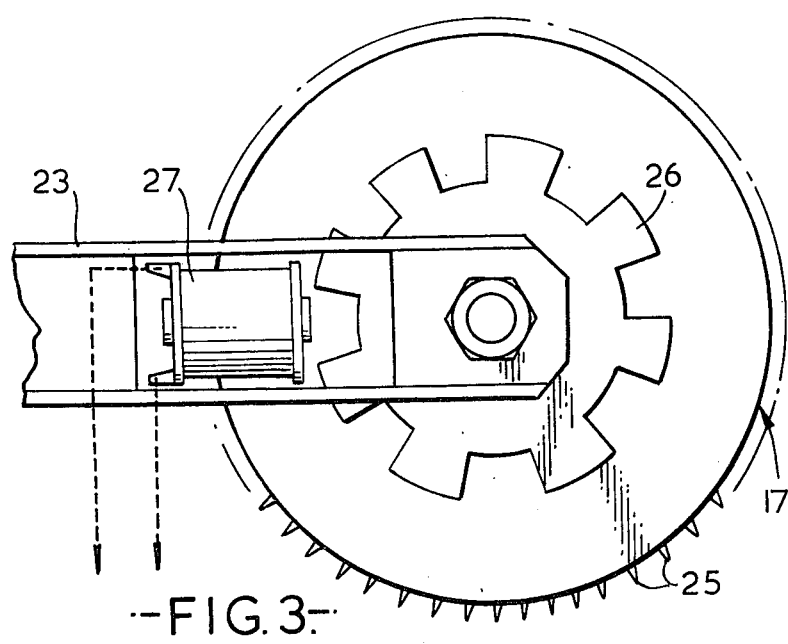

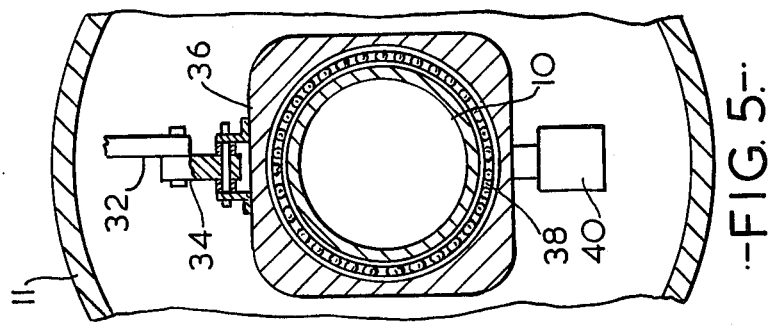
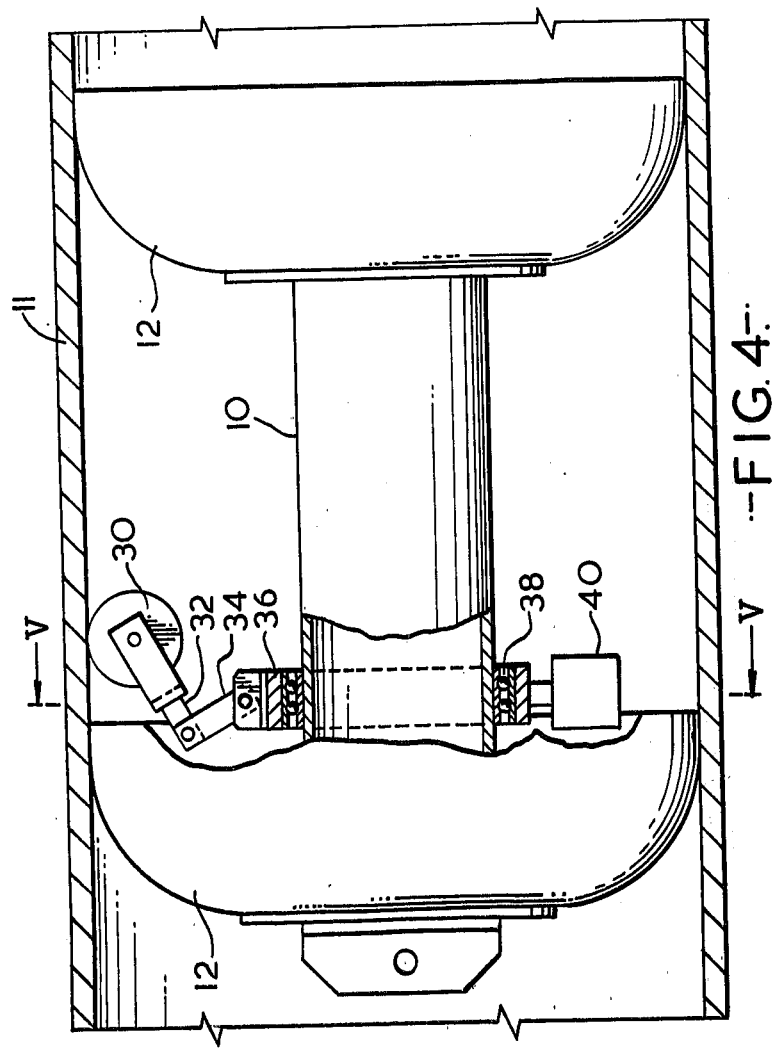

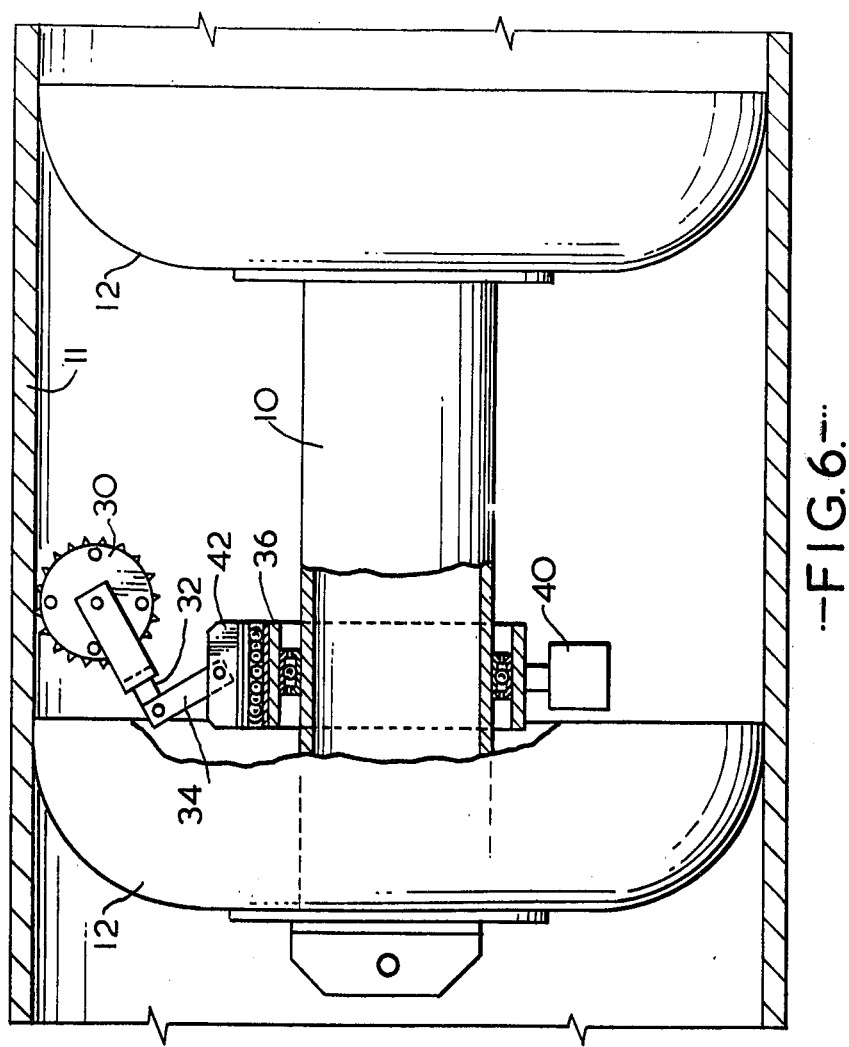

PIPELINE PIGS

FIELD OF THE INVENTION

This invention relates to pipeline pigs and more particularly to magnetically trackable pipeline pigs.

BACKGROUND OF THE INVENTION

In order to provide a pipeline pig whose location in a pipeline can be determined from outside the pipeline, it is already known to provide a magnetic attachment comprising a collar of intensely magnetised steel blocks with steel pole plates arranged to saturate the entire pipe wall and give rise to a detachable leakage field. In general, the pole plates are so arranged that the direction of the field in the pipe wall is parallel to the axis of the pipeline.

This arrangement suffers from the disadvantage that, in order to ensure adequate magnetic coupling between the pole structure and the pipe wall, the diameter of the magnetic collar must be not less than about 90% of the internal diameter of the pipe. This means that the pig cannot pass obstructions which reduce the diameter of the pipe by more than 10%. Consequently, its use is restricted to applications where a gauge plate is used or for batch separating and swabbing duties. It is not feasible to use the pig to make a record of obstructions and distortions in the pipeline without stopping at any particular obstruction or distortion. In addition, the magnetic collar is very heavy. This means that the seals, which enable the pig to be propelled by pumping liquid from behind it, are subject to excessive wear and that the pig tends to travel eccentrically with respect to the pipeline so that it is more sensitive to obstructions in the bottom of the pipeline than in the top.

SUMMARY OF THE INVENTION

According to the invention, there is provided a magnetically detectable attachment for a pipeline pig comprising a wheel formed from circular plates of magnetic material spaced apart for rotation on a common axis, means for producing a magnetomotive force between the rims of said circular plates and means for mounting the wheel on a pig so that, in use, it rolls along in contact with the inner surface of a pipe wall.

The means for producing the magnetomotive force may comprise a permanent magnetic core mounted between the circular plates with its magnetic axis coaxial with the axis of rotation.

Thus, in contrast with the previously known magnetically locatable pipeline pig described above, magnetisation of the wall of the pipeline is confined to a narrow longitudinally extending strip. This considerably reduces the weight of the permanent magnet required to provide the necessary magnetomotive force. The attachment is preferably oriented in the pipeline so that the magnetised strip is oriented in the most convenient position for detection. In the case of a buried pipeline this will usually be along the top of the pipe. Also in contrast to the above-described known arrangement, the direction of the magnetic field in the wall of the pipe is transverse to the pipe axis.

To enable the magnetically detectable attachment to pass obstructions in the pipeline, the mounting means for the wheel is preferably so arranged that the wheel can move in a direction having a component perpendicular to the pipe axis and is resiliently urged into contact with the inner surface of the pipe wall.

BRIEF DESCRIPTION OF THE DRAWINGS

Pipeline pigs having magnetically detectable attachments in accordance with the invention will now be described by way of example with reference to the accompanying drawings, in which:

FIG. 2 is an end view of a magnetic wheel for use with the pig shown in FIG. 1, FIG. 3 is a schematic diagram illustrating a distance measuring arrangement for use with the pig shown in FIG. 1, FIG. 4 is a partially broken-away side view of a pipeline pig in accordance with another embodiment of the invention, FIG. 5 is a cross-sectional view taken on the line V — V in FIG. 4, and FIG. 6 is a partially broken-away side view of a pipeline pig in accordance with a further embodiment of the invention.

DESCRIPTION OF THE PREFERRED EMBODIMENT

Figure 1:
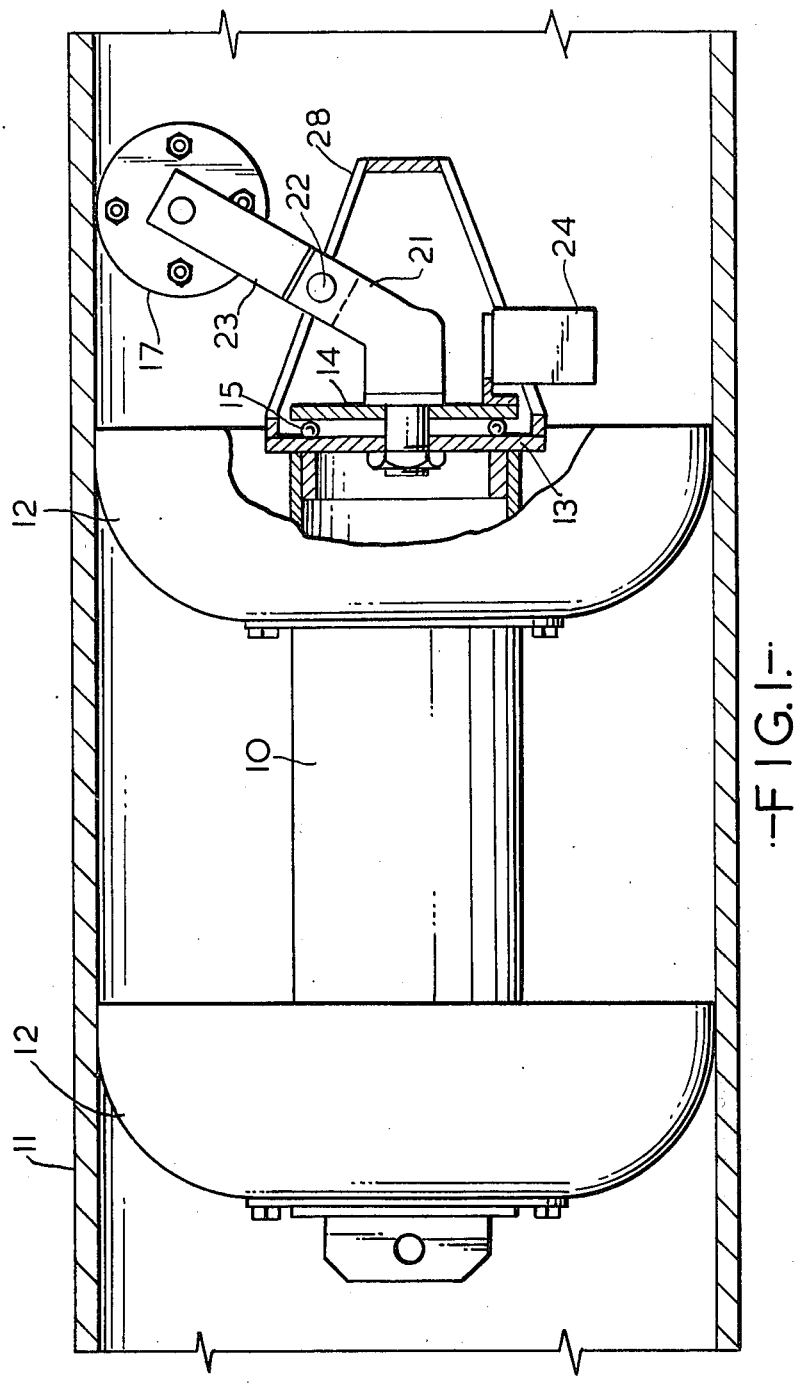
FIG. 1 is a partially broken-away side view of a pipeline pig in accordance with the invention.

Referring to FIGS. 1 and 2, a pipeline pig has a body 10 of diameter less than two thirds of the internal diameter of a pipe 11 in which it is to operate so that major obstructions can be negotiated. The pig body 10 is supported on dome-shaped flexible seals 12 made of polyurethane or a similar material. The pig illustrated has two such seals 12 although a greater number can be provided if desired. All the seals 12 face in the same direction as one another so that the pig can be propelled along a pipeline by pumping fluid into the pipeline from behind it.

The rear end of the body of the pig is closed by a plate 13 on which a disc 14 is mounted for rotation about the axis of the pig body 10, a ball race 15 being interposed between the confronting faces of the end plate 13 of the pig body and the rotatable disc 14.

A wheel 17 comprising two pole plates 18 and 19 with a permanent magnet 20 (see FIG. 2) therebetween is mounted on an articulated arm having a fixed inner part 21 which is mounted on the rotatable disc 14. The inner part 21 of the arm is coupled by a spring pivot assembly 22 to an outer part 23 so that the wheel 17 is urged into contact with the top surface of the pipe wall. The rotatable disc 14 is provided with a counterweight 24 to maintain the axis of the wheel 17 horizontal.

The disc 18 and 19 of the wheel 17 are in direct contact with the inner surface of the pipe wall and are provided with perimeter spikes 25 of, for example, tungsten steel to bite into the wall. Alternatively, a magnetic polymer such as iron-loaded polyurethane may be applied as a coating to the rims of the discs. It is also possible to make the entire disc of an iron-loaded polymer.

A protective cage 28 is mounted on the plate 13 and projects beyond the spring pivot assembly for the magnetic wheel 17. When the pig is initially inserted in to the pipeline, a hydraulic jack can engage with the back of the cage 28 to provide the necessary thrust without risk of damaging the pig.

Referring to FIG. 3, in order to provide a signal indicating the distance which the pig has travelled along a pipeline, the disc 18 has a side portion 26 formed with teeth confronting a magnetic pick up coil 27. The coil produces an output pulse as it is passed by each tooth and a record of distance travelled is obtained by counting these pulses.

FIGS. 4 and 5 show an alternative form of pipeline pig in accordance with the invention which is similar to the pig shown in FIG. 1 in that it has a body 10 supported on two flexible seals 12. However, instead of having a magnetic wheel mounted on the rear end thereof, the pig shown in FIGS. 4 and 5 has a magnetic wheel 30 located between the two seals 12 and mounted on the outer part 32 of an articulated arm. The outer part 32 of the articulated arm is connected by a spring pivot to an inner part 34 which is mounted on a collar 36 which in turn surrounds the pig body 10 and is mounted thereon by means of a ball race 38. A counterweight 40 is provided to keep the magnetic wheel 30 aligned with the top of the pipe.

The constructions of the magnetic wheel 30 shown in FIG. 4 is similar to that of the magnetic wheel 17 as shown in FIGS. 2 and 3. A coil similar to the coil 27 may be mounted on the outer part 32 of the articulated arm to obtain a measurement of distance travelled.

FIG. 6 illustrates a further pipeline pig in accordance with the invention which is generally similar to the pig shown in FIGS. 4 and 5 in that it has a magnetic wheel 30 mounted on an articulated arm formed in two parts 32 and 34. However, the inner part 34 of the articulated arm is coupled to a mounting plate 42 which is pivotally mounted on the collar 36 for movement about an axis which is perpendicular both to the longitudinal axis of the pipeline and to the axis of rotation of the wheel 30 so as to allow the wheel 30 to have a castoring action. This arrangement avoids any risk of the axis of the magnetic wheel 30 being slightly out of alignment with its correct transverse orientation so as to cause the wheel 30 to follow a spiral course along the inside of the pipe thereby giving an excessive indication of distance travelled. A similar modification may be made to the pig shown in FIG. 1, provision for castoring being provided between the inner part 21 of the articulated arm and the mounting on the disc 14.

What is claimed is:

1. A magnetically detectable attachment for a pipeline pig comprising a wheel formed from two circular plates of magnetic material spaced apart for rotation on a common axis, means for producing a magnetomotive force between the rims of said circular plates and means for rotatably mounting the wheel on a pig with its axis of rotation perpendicular to the longitudinal axis of the pig so that, in use, it rolls along with the peripheries of the two discs in contact with the inner surface of a pipe wall.

2. An attachment according to claim 1, wherein the means for producing the magnetomotive force comprises a permanent magnetic core mounted between the circular plates with its magnetic axis co-axial with the axis of rotation.

3. An attachment according to claim 1, wherein the mounting means for the wheel includes resilient means arranged to permit displacement of the wheel in a direction having a component perpendicular both to its axis of rotation and the longitudinal axis of the pig whereby, in use, the wheel is resiliently urged in to contact with the inner surface of the pipe wall.

4. An attachment according to claim 3, wherein the mounting means comprises a spring-loaded arm.

5. An attachment according to claim 1, wherein the mounting means for the magnetic wheel includes coupling means for coupling said mounting means to a pig so that said mounting means are rotatable about the longitudinal axis of the pig.

6. An attachment according to claim 5, wherein the mounting means comprises a plate attached to the rear of the pig by the coupling means.

7. An attachment according to claim 5, wherein the mounting means comprises a collar surrounding the body of the pig and the coupling means comprises a bearing supporting the mounting means on the body of the pig.

8. An attachment according to claim 1, wherein the mounting means includes pivot means coupling the axis of the magnetic wheel to the pig and arranged to allow pivotal movement of the magnetic wheel about an axis perpendicular both to the axis of the pig and to the axis of the wheel to enable the wheel to operate as a castor.

9. An attachment according to claim 1, in which one of the circular plates of the wheel has a toothed portion of magnetic material on the outer side thereof and a coil is mounted on the mounting means confronting said toothed portion and arranged to detect changes in the magnetic field from said toothed portion as said wheel rotates.

* * * * *